(12) United States Patent
Ilzuka

(10) Patent No.: US 7,756,625 B2
(45) Date of Patent: Jul. 13, 2010

(54) CONTROL APPARATUS FOR VEHICLE

(75) Inventor: Tadataka Ilzuka, Shizuoka (JP)

(73) Assignee: JATCO Ltd, Fuji-shi (JP)

(*) Notice: Subject to any disclaimer, the term of this patent is extended or adjusted under 35 U.S.C. 154(b) by 944 days.

(21) Appl. No.: 11/387,878

(22) Filed: Mar. 24, 2006

(65) Prior Publication Data

US 2006/0224292 A1 Oct. 5, 2006

(30) Foreign Application Priority Data

Mar. 31, 2005 (JP) ............................ 2005-102571

(51) Int. Cl.
*G06F 17/00* (2006.01)
(52) U.S. Cl. ........................... 701/54; 340/459
(58) Field of Classification Search .................. 701/54, 701/29–31, 34–36, 102, 114, 115, 63; 340/459; 307/10.1
See application file for complete search history.

(56) References Cited

U.S. PATENT DOCUMENTS

| | | | | |
|---|---|---|---|---|
| 4,499,879 A | * | 2/1985 | Stoltman et al. | 123/480 |
| 5,624,351 A | * | 4/1997 | Fujita et al. | 477/148 |
| 5,882,276 A | * | 3/1999 | Usuki et al. | 477/120 |
| 7,010,968 B2 | * | 3/2006 | Stewart et al. | 73/146 |
| 7,245,225 B2 | * | 7/2007 | Kamio et al. | 340/648 |

FOREIGN PATENT DOCUMENTS

JP 07-243518 A 9/1995

\* cited by examiner

*Primary Examiner*—Dalena Tran
(74) *Attorney, Agent, or Firm*—Foley & Lardner LLP

(57) ABSTRACT

A control apparatus for a vehicle includes a RAM adapted to require a power to store and retain data. A nonvolatile memory is provided to be adapted not to require a power to store and retain data. Additionally, a CPU is provided to be adapted to make watch and/or control of an engine and/or an automatic transmission based on the data stored in the RAM. In this control apparatus, the CPU includes a park range position selection judging device for making a decision that the park range position is selected by an operator, and a data storing device for causing the data stored in the RAM to be stored in the nonvolatile memory, based on the decision that the park range position is selected.

8 Claims, 5 Drawing Sheets

CONTROL APPARATUS FOR VEHICLE

BACKGROUND OF THE INVENTION

This invention relates to a control apparatus for a vehicle, including a RAM adapted to require a power to store and retain data, a nonvolatile memory adapted not to require a power to store and retain data, a CPU adapted to watch and/or control an engine and/or an automatic transmission based on data stored in the above-mentioned RAM.

As a memory used for storing data, there is one which is called a nonvolatile memory whose data cannot erased even if a power is turned off. Additionally, as a control apparatus for a vehicle employing a so-called learning control by which a suitable control is made based on data stored in the past, there has been proposed a system which is arranged to accomplish the learning control of a suitable line pressure upon determining a deviation of inertia torque during a shift of an automatic transmission for the purpose of lightening a shift shock of the automatic transmission. In this conventional system, a learning correction value for the line pressure control is stored after an ignition switch is turned OFF. Such a technique is disclosed in Japanese Patent Provisional Publication No. 7-243518.

A hardware configuration of a power supply circuit for storage in the above conventional system is schematically illustrated in FIG. 4 in which known techniques such as a A/D converter, a ROM (read-only memory) and the like are omitted for the purpose of simplicity of illustration. The above conventional system includes a transmission controller 100' arranged to accomplish a shift control of the automatic transmission. The transmission controller 100' includes a RAM 101' adapted to require a power to store and retain data, a EEP-ROM (nonvolatile memory) 102', and a CPU 103' adapted to watch or control the automatic transmission based on present or past data stored in the RAM 101'. The CPU 103' is normally adapted to read data accumulated in the RAM so as to accomplish a hydraulic pressure control and a trouble judgment for the automatic transmission. However, when the ignition switch is turned ON, the CPU 103' is adapted to read data accumulated in the EEP-ROM 102' so as to initiate processing such as calculation, command and the like based on these data.

A main power (source) or existing battery 110' is for supplying a power to the transmission controller 100' (i.e., the RAM 101', the EEP-ROM 102' and the CPU 103'). This battery 110' is the power common to controls for whole the vehicle including an engine, a lock-up torque converter and an automatic transmission. A voltage regulator 111' is provided to supply a power having a voltage Vcc required by the CPU 103' when a power is supplied from the battery 110' to the transmission controller 100'. This voltage regulator 111' is connected to the battery 110' through a shutoff circuit 112' which will be discussed after.

A flowchart illustrating a control processed by the CPU 103' is shown in FIG. 5. This control is executed every several msec upon trigger of turning-ON of the ignition switch 5'. In FIG. 5, first at a step S11, a rise of an ignition (IGN) voltage Vign at an ignition coil is waited until the ignition voltage Vign exceeds a threshold value V1' which can satisfy a voltage required for the controls for whole the vehicle. When a decision is made such that the ignition voltage Vign exceeds the threshold value V1', it is judged that the ignition voltage Vign can satisfy the voltage required for the controls of whole the vehicle, and a flow goes to a step S12 at which the RAM 101' is initialized.

At a step S13, a memory is checked. When a decision is made such that such memory checking is completed at the step S14, the control goes to a step S15 at which a CAN (Controller Area Network) communication is initiated to enable mutual data communication among electronic control devices mounted on the vehicle. At a step S16, a line pressure PL and the like to be supplied to the automatic transmission are controlled. At a step S17, a shift lock control is made so that a select lever cannot be located to a parking (P) range position if a brake pedal is not depressed.

At a step S18, the flow returns to the step 15 until the ignition voltage is judged to be not higher than V1, thereby continuing the hydraulic pressure control to the automatic transmission. Then, when the ignition voltage Vign is judged to be lower than the threshold value V1 at a step S18, the present or past data are stored to the EEP-ROM 102 from the RAM 101 (i.e., learning and/or trouble codes are written in the EEP-ROM) at a step S19. Thereafter, the flow goes to a step S20 at which a shutoff circuit 112' is operated thereby shut off the power supply from the main power 110.

BRIEF SUMMARY OF THE INVENTION

However, in the above conventional control apparatus, it is necessary to write the date in the EEP-ROM as the nonvolatile memory after the ignition switch is turned OFF. This requires vehicle harness for battery backup and the shutoff circuit 112, which is disadvantageous from the viewpoint of cost.

Therefore, it is an object of the present invention is to provide an improved control apparatus for a vehicle, which can effectively overcome drawbacks encountered in conventional control apparatuss of the similar nature.

Another object of the present invention is to provide an improved control apparatus for a vehicle, in which storing data can be effectively made without inviting a cost increase based on a complicated hardware configuration of a memory circuit.

According to the present invention, a control apparatus for a vehicle, comprises a RAM adapted to require a power to store and retain data. A nonvolatile memory is provided to be adapted not to require a power to store and retain data. Additionally, a CPU is provided to be adapted to make watch and/or control of an engine and/or an automatic transmission based on the data stored in the RAM. In this control apparatus, the CPU includes a park range position selection judging device for making a decision that the park range position is selected by an operator, and a data storing device for causing the data stored in the RAM to be stored in the nonvolatile memory, based on the decision that the park range position is selected.

With the above arrangement, if selection of the P range position is decided in which there is the possibility of a ignition switch being turned OFF, the data stored in the RAM are stored in nonvolatile memory whose data cannot be erased even if the power supply is shut off. Accordingly, even if an operator turns the ignition switch off for parking the vehicle, the necessary data can be stored without requiring a new backup power (source). Therefore, a vehicle harness for battery backup and a shutoff circuit (which are required in conventional techniques) are not required, so that data can be stored without inviting a cost rising due to a complicated hardware configuration of a memory circuit.

DETAILED DESCRIPTION OF THE INVENTION

Figure 1:
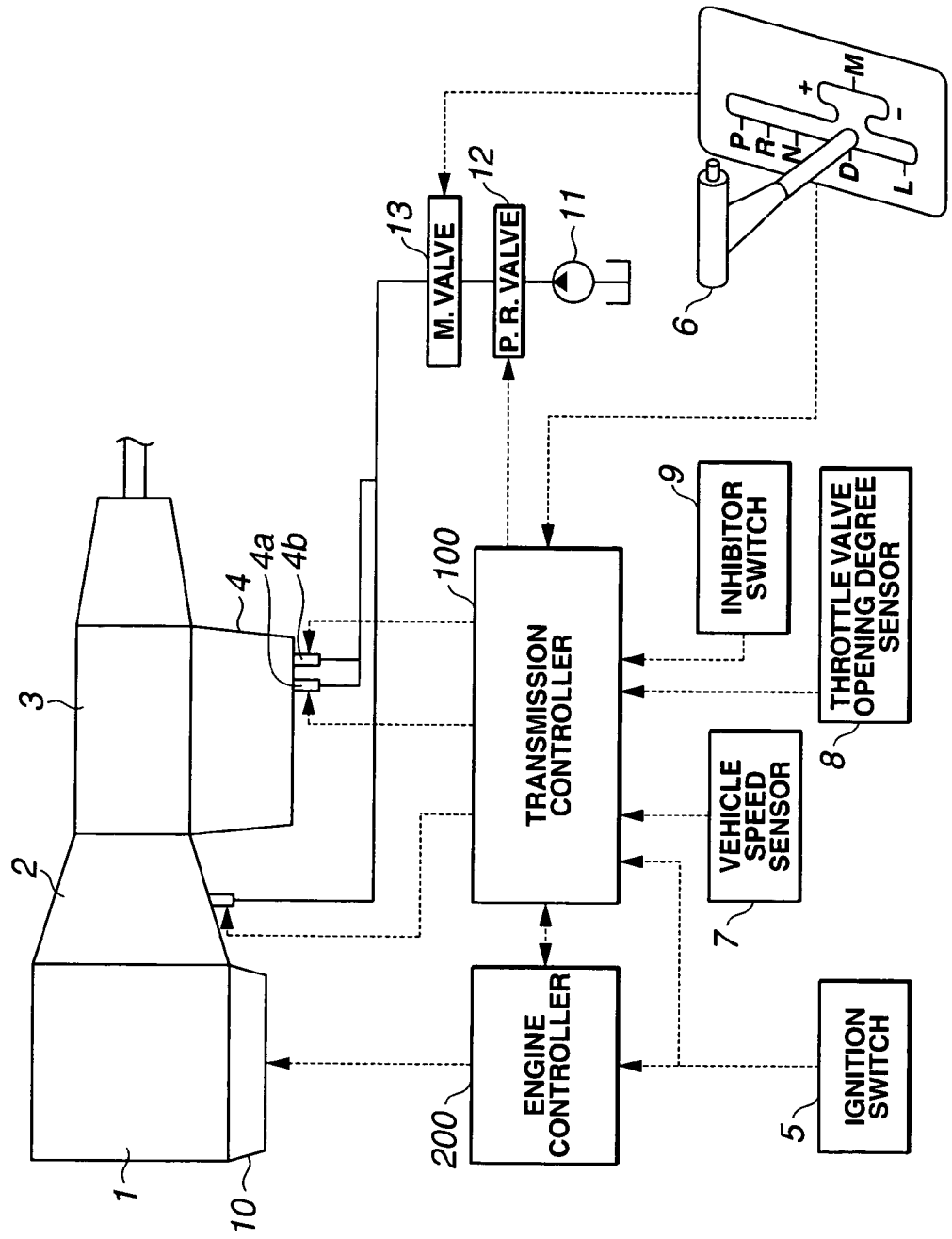
FIG. 1 is a schematic illustration showing an outline of an embodiment of a control apparatus for a vehicle, according to the present invention.

Referring now to FIG. 1, an embodiment of a control apparatus for a vehicle, according to the present invention is illustrated in combination with an engine 1 a as a driving source. This engine 1 is drivingly connected through a lock-up torque converter 2 to an automatic transmission 3. The automatic transmission 3 is controlled under the action of hydraulic (oil) pressure and has a control valve unit 4 including a plurality of hydraulic pressure control valves. Each control valve of the control valve unit 4 is duty-controlled by a transmission controller 100.

The transmission controller 100 is adapted to operate in accordance with ON and OFF signals from an ignition switch 5. Various signals are input to the transmission controller 100, the signals including, for example, range position signals P, R, N, D which respectively correspond to a P (Park) range position, a R (Reverse) range position, a N (Neutral) range position, a D (Forward drive) range position selected under driver's operation to a shift or selector lever 6; a vehicle speed signal from a vehicle speed sensor 7 for detecting a vehicle speed VSP; and a throttle valve opening degree signal from a throttle valve opening degree sensor 8 for detecting a throttle valve opening degree TVO.

An oil pump 11 is driven by the engine 1 and fluidly connected to a pressure regulator valve 12 which is duty-controlled by the transmission controller 100 so as to regulate hydraulic (oil) pressure from the oil pump 11. The hydraulic pressure regulated by this pressure regulator 12 serves as a line pressure LP. The pressure regulator valve 12 is fluidly connected through a manual valve 13 to shift valves 4a, 4b which are examples of hydraulic pressure control valves duty-controlled by the transmission controller 100 so as to control hydraulic pressure within the control valve unit 4. The hydraulic pressures regulated by these shift valves 4a, 4b serve as control pressures for actually accomplishing shift controls of the automatic transmission 3. The manual valve 13 is adapted to regulate the line pressure LP in accordance with the range positions selected by the shift lever 5. In other words, the transmission controller 100 is arranged to calculate a suitable target speed ratio of the transmission 3 based on the vehicle speed VSP, the throttle valve opening degree TVO and the like, and to duty-control each of the valves 4a, 4b, 12 so as to obtain the target speed ratio.

The engine 1 is provided with an engine control unit 10 including a throttle valve for controlling power output of the engine 1, a distributor and spark plugs. The throttle valve and the like of the engine control unit 10 are controlled by an engine controller 200. The engine controller 200 is in a condition enabling a bothway communication between it and the transmission controller 100 and can suitably control an engine torque T of the engine 1 in accordance with input information from the transmission controller 100. Specifically, the controlling the engine torque includes an ignition timing retarding control for retarding the spark timing of the engine, a throttle valve opening degree control for restricting the opening movement of the throttle valve, a fuel cut control for restricting the fuel supply to the engine 5, and the like.

Figure 2:
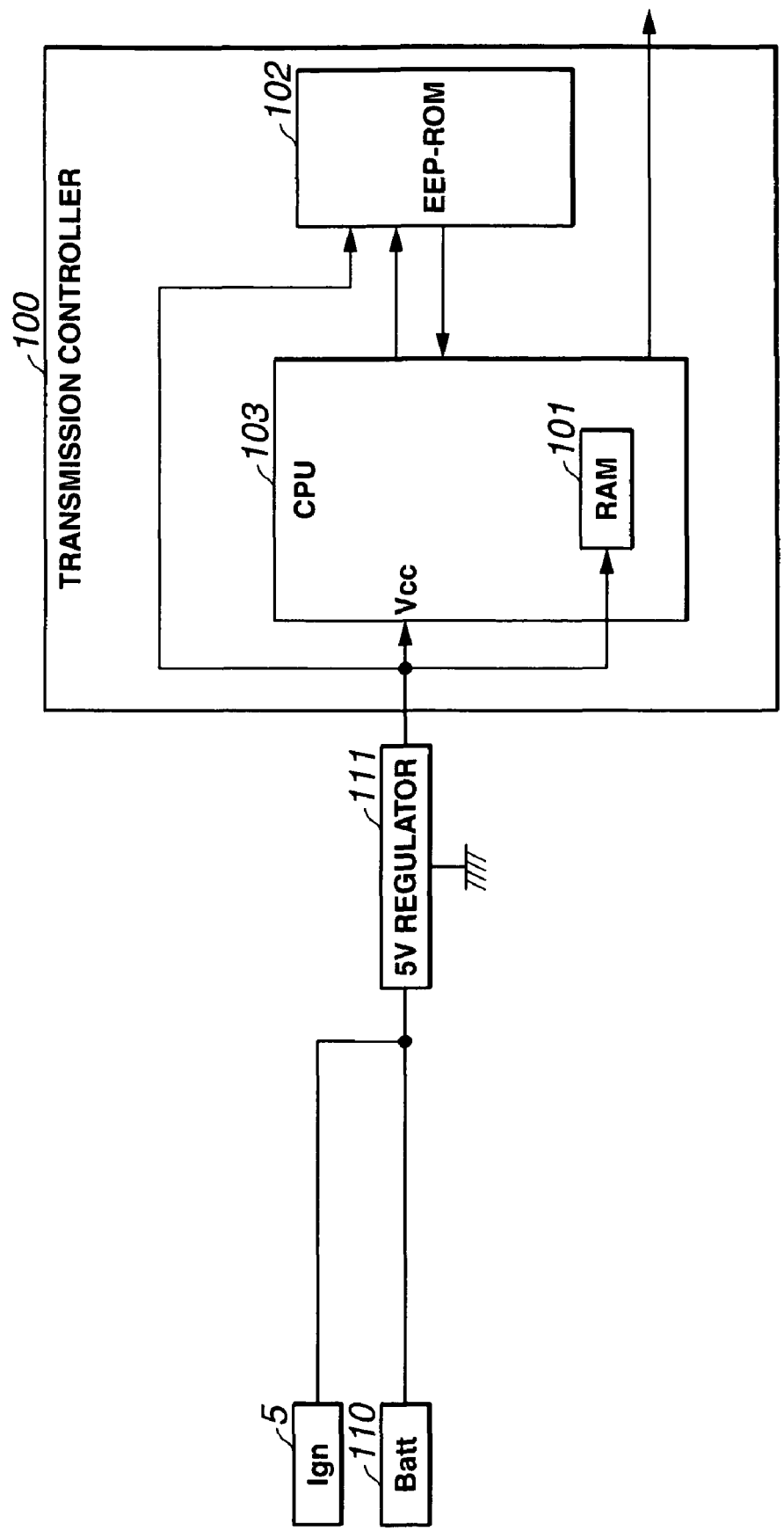
FIG. 2 is a schematic illustration showing a hardware configuration of a power supply circuit for storage, used in the control apparatus of FIG. 1.

FIG. 2 schematically shows a hardware configuration of a power supply circuit for storage in this embodiment, in which known techniques such as a A/D converter, a ROM (read-only memory) and the like are omitted for the purpose of simplicity of illustration.

The transmission controller 100 includes a RAM 101 adapted to require a power to store and retain data, a EEP-ROM (nonvolatile memory) 102 adapted not to require a power to store and retain data, and a CPU adapted to watch and/or control the automatic transmission 3 (and/or the engine 1) based on present (current) data or past (preceding) data stored in the RAM 101. The CPU 103 normally accomplishes a hydraulic pressure control and a trouble judgment for the automatic transmission 3 upon reading data stored in the RAM 101. However, when the ignition switch 5 is turned ON, the CPU 103 reads the data stored in the EEP-ROM 102 and initiates processing such as calculation, commanding and the like based on the read data.

A main power (source) or existing battery 110 is for supplying a power to the transmission controller 100 (I.e., the RAM 101, the EEP-ROM 102 and the CPU 103). This battery 110 is the power common to controls for whole the vehicle including an engine 1, a lock-up torque converter 2 and an automatic transmission 3. A voltage regulator 111 is provided to supply a power having a voltage Vcc required by the CPU 103 when a power is supplied from the battery 110 to the transmission controller 100.

Figure 3:
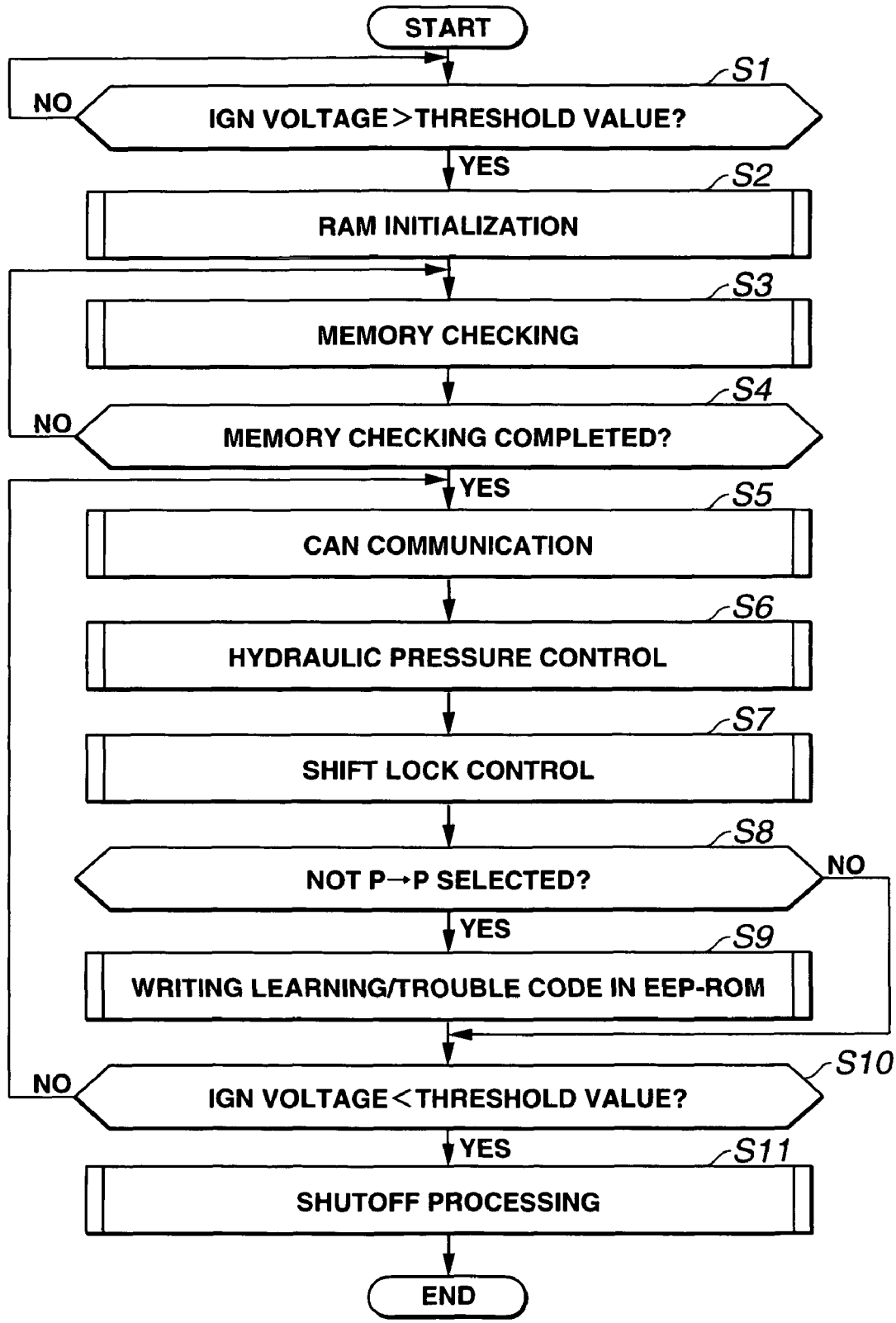
FIG. 3 is a flowchart showing a control executed by a CPU contained in the power supply circuit of FIG. 2.
Figure 4:
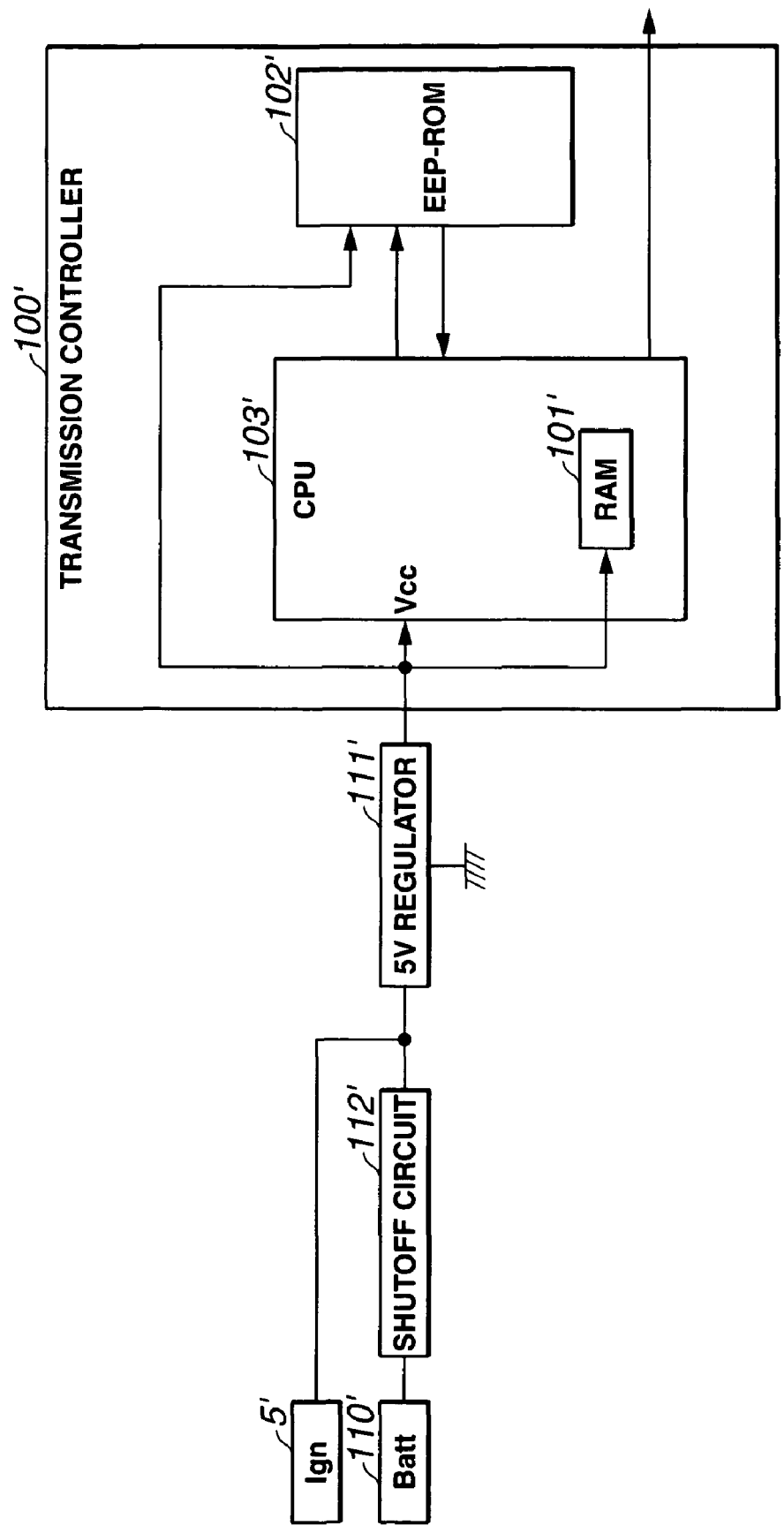
FIG. 4 is a schematic illustration showing a hardware configuration of a power supply circuit for storage, used in a conventional control apparatus for a vehicle.
Figure 5:
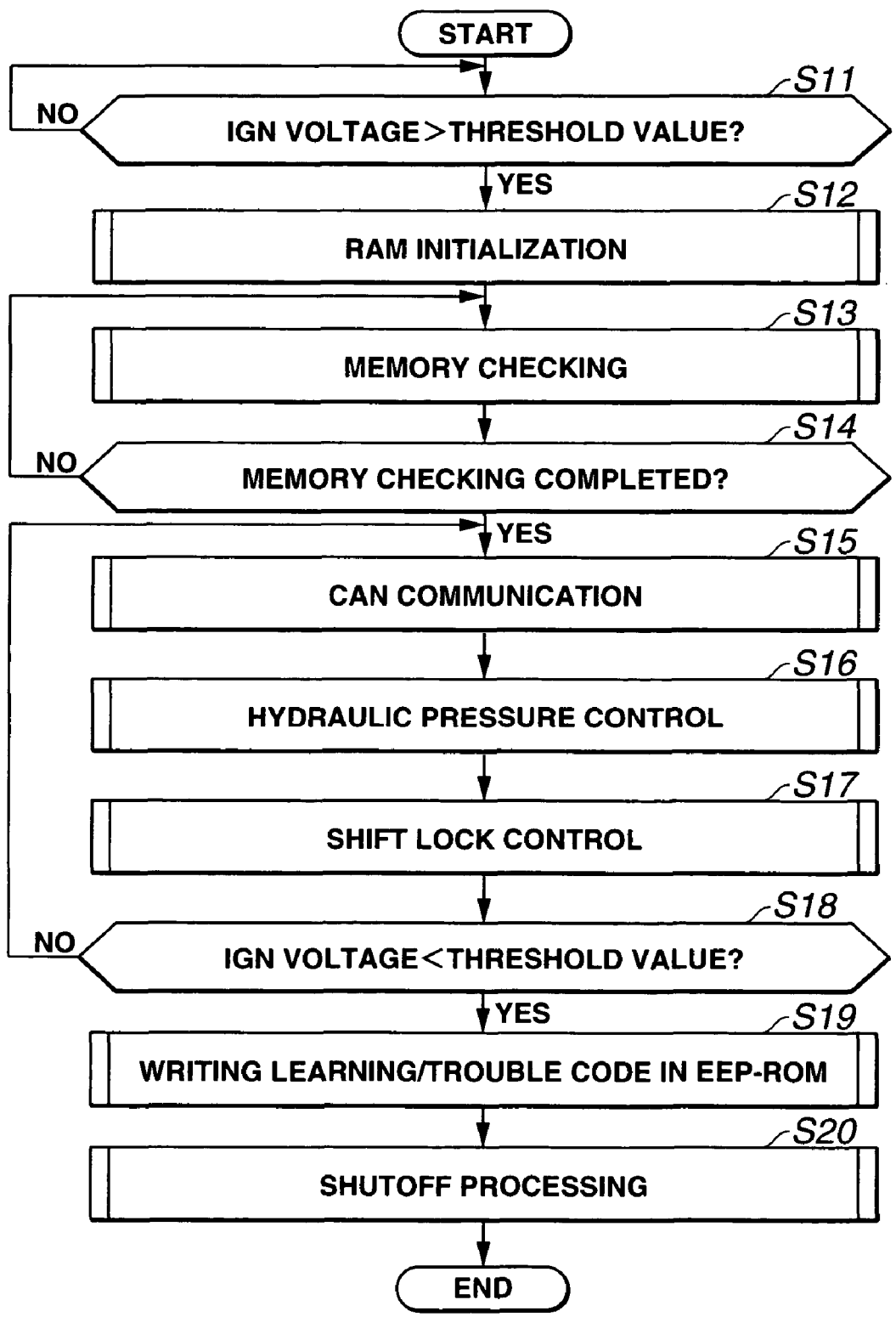
FIG. 5 is a flowchart showing a control executed by a CPU contained in the power supply circuit of FIG. 4.

A flowchart illustrating a control processed by the CPU 103 is shown in FIG. 3. This control is executed every several msec upon trigger of turning-ON of the ignition switch 5. In FIG. 3, first at a step S1, a rise of an ignition (IGN) voltage Vign at an ignition coil is waited until the ignition voltage Vign exceeds a threshold value V1 which can satisfy a voltage required for the controls for whole the vehicle. When a decision is made such that the ignition voltage Vign exceeds the threshold value V1, it is judged that the ignition voltage Vign can satisfy the voltage required for the controls of whole the vehicle, and a flow goes to a step S2 at which the RAM is initialized so that the data stored in the EEP-ROM 102 is written in the RAM 101.

At a step S3, a memory is checked. When a decision is made such that such memory checking is completed at the step S4, the flow goes to a step S5 at which a CAN (Controller Area Network) communication is initiated to enable mutual data communication among electronic control devices mounted on the vehicle. At a step S6, each of the valves 4a, 4b, 12 is duty-controlled to control the line pressure PL and the like to be supplied to the automatic transmission 3. At a step S7, a shift lock control is made so that the selector 6 lever cannot be located to the parking range position (P) if a brake pedal is not depressed.

Thereafter, at a step S8, a judgment is made as to whether the selector lever 6 has been selectively located to the P range position from a non-P (park) range position such as the D range position or the like. It will be understood that the step S8 corresponds to a park range position selection judging device. The judgment as to whether the selector lever 6 is selectively located to the P range position may be accomplished by detecting a change of one of the range position (selection) signals P, R, N, D from the selector lever 6 to another; however, it is preferable that the judgment is accomplished by sensing presence or absence of an input signal from an inhibitor switch 9 serving as a safety device upon detecting that the selector lever 6 is selectively located at the P or N range position when a starter motor is rotated.

When the decision of the judgment is made such that the selector lever 6 has not been selectively located at the P range position at the step S8, the past or present data are stored in the RAM 101, and the flow goes to a step S10 skipping a step S9. In this case, a vehicle running condition is normally assumed, and therefore the ignition voltage Vign exceeds the threshold value V1, so that the flow returns to the step S5 thereby to continue the hydraulic pressure control to the automatic transmission 3. However, if the ignition voltage Vign is decided to be not higher than the threshold value V1, it seems that there is any trouble, so that the flow goes to a step S11 at which the power supply from the main power (source) 110 is shut off for the purpose of fail-safe.

To the contrary, the decision of the judgment is made such that the selector lever 6 has been selectively located at the P range position, the flow goes to the step S9 at which the past or present data from the RAM 101 are stored into the EEP-ROM 102 (i.e., learning and/or trouble codes are written in the EEP-ROM). At the step S10, judgment is made as to whether the ignition voltage Vign is lower than the threshold value V1 or not. If the decision of the judgment is such that the ignition voltage Vign is lower than the threshold value V1, the flow goes to a step S11 at which the power supply from the main power (source) 110 is shut off for the purpose of fail-safe. However, if the ignition voltage Vign has been still not lower than the threshold value V1 at the step S10, the flow returns to the step S5 thereby continuing the hydraulic pressure control for the automatic transmission 3.

While the explanation has been made on storing data to be used for the learning control of the line pressure to be supplied to the automatic transmission 3 or of the hydraulic pressure control for shift timing of the automatic transmission in the flowchart of FIG. 3, it will be understood that the explanation may be similarly applied to storing data to be used for a slip control in the lock-up torque converter and for a learning control in a torque-down control for the engine 1.

As discussed above, according to the above embodiment, if selection of the P range position is decided in which there is the possibility of the ignition switch 5 being turned OFF, the data stored in the RAM 101 are stored in the EEP-ROM 102 whose data cannot be erased even if the power supply is shut off. Accordingly, even if an operator turns the ignition switch 5 off for parking the vehicle, the necessary data can be stored without requiring a new backup power (source). Therefore, in the above embodiment, a vehicle harness for battery backup and a shutoff circuit (which are required in conventional techniques) are not required, so that data can be stored without inviting a cost rising due to a complicated hardware configuration of a memory circuit.

Additionally, in this embodiment, only in case that selection of the P range position is decided, the data stored in the RAM 101 are stored into the EEP-ROM 102, and therefore the number of writings to the EEP-ROM 102 can be reduced to the minimum value.

Further, it is preferable that the judgment of selection of the P range position is accomplished by the signal input from the inhibitor switch 9 as in the above embodiment. This makes easy decision of the P range position selection, and therefore can simplify storing data.

Furthermore, if the data to be stored in the EEP-ROM 102 is the learning correction value in the learning control of the line pressure, the shift timing of the transmission, or the torque-down amount during the engine control as in the above embodiment, a reliability of the learning control at restarting of the vehicle cannot be lowered because the latest learning correction value at a time immediately before the ignition switch 5 is turned OFF can be obtained.

Furthermore, if the data to be stored in the EEP-ROM 102 are trouble codes for deciding troubles in the input sensors for detecting the operating conditions of the vehicle, such as the vehicle speed sensor 7, the throttle valve opening degree sensor 8 and the like, or trouble codes for deciding troubles in the control objects such as the valves 4a, 4b, 12 and the like as in the above embodiment, a reliability in the trouble decision at the restarting of the vehicle and in the control according to the trouble decision cannot be lowered because the latest trouble codes at a time immediately before the ignition switch 5 is turned OFF can be obtained.

The entire contents of Japanese Patent Application P2005-102571 (filed Mar. 31, 2005) are incorporated herein by reference.

Although the invention has been described above by reference to certain embodiments of the invention, the invention is not limited to the embodiments described above. Modifications and variations of the embodiments described above will occur to those skilled in the art, in light of the above teachings. The scope of the invention is defined with reference to the following claims.

What is claimed is:

1. A control apparatus for a vehicle, comprising:
   a RAM adapted to require a power to store and retain data;
   a nonvolatile memory adapted not to require a power to store and retain data; and
   a CPU adapted to make at least one of watch and control of at least one of an engine and an automatic transmission based on the data stored in the RAM,
   wherein the CPU includes a park range position selection judging device for making a decision that the park range position is selected by an operator, and a data storing device for causing the data stored in the RAM to be stored in the nonvolatile memory, based on the decision that the park range position is selected.

2. A control apparatus as claimed in claim 1, wherein the park range position selection judging device makes the decision that the parking range position is selected, based on input of a signal from an inhibitor switch.

3. A control apparatus as claimed in claim 1, wherein the CPU is electrically connected to the RAM and the nonvolatile memory.

4. A control apparatus as claimed in claim 1, wherein the data storing device of the CPU is adapted to cause the data stored in the RAM to be stored in the nonvolatile memory, before an ignition switch is turned OFF.

5. A controller assembly for a vehicle including a transmission, the controller assembly comprising:
   a RAM requiring power to store and retain data;
   a nonvolatile memory configured to store and retain data in the absence of power; and
   a CPU configured to watch and/or control an engine and/or an automatic transmission based on the data stored in the RAM,
   wherein the CPU is configured to determine whether a park range position is selected by an operator, and cause data stored in the RAM to be stored in the nonvolatile memory, based on the decision that the park range position is selected.

6. A controller assembly as claimed in claim 5, wherein the CPU makes the decision that the park range position is selected, based on input of a signal from an inhibitor switch.

7. A controller assembly as claimed in claim 5, wherein the CPU is electrically connected to the RAM and the nonvolatile memory.

8. A controller assembly as claimed in claim 5, wherein the data storing device of the CPU is adapted to cause the data stored in the RAM to be stored in the nonvolatile memory, before an ignition switch is turned OFF.

* * * * *

UNITED STATES PATENT AND TRADEMARK OFFICE
CERTIFICATE OF CORRECTION

| | | |
|---|---|---|
| PATENT NO. | : 7,756,625 B2 | |
| APPLICATION NO. | : 11/387878 | |
| DATED | : July 13, 2010 | |
| INVENTOR(S) | : Tadataka Iizuka | |

It is certified that error appears in the above-identified patent and that said Letters Patent is hereby corrected as shown below:

Title Page

The inventor's name should read as:

(75)    Tadataka Iizuka

Signed and Sealed this

Thirtieth Day of November, 2010

David J. Kappos
*Director of the United States Patent and Trademark Office*